(12) United States Patent
Browning et al.

(10) Patent No.: US 9,996,133 B2
(45) Date of Patent: Jun. 12, 2018

(54) DETECTION OF UNDOCKING FOR ELECTRONIC DEVICES

(71) Applicant: Intel Corporation, Santa Clara, CA (US)

(72) Inventors: David W. Browning, Portland, OR (US); Vijaykumar B. Kadgi, Portland, OR (US); Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 14/976,097

(22) Filed: Dec. 21, 2015

(65) Prior Publication Data

US 2017/0177053 A1 Jun. 22, 2017

(51) Int. Cl.
| G06F 1/32 | (2006.01) |
| G06F 1/26 | (2006.01) |
| G06F 1/00 | (2006.01) |
| G06F 1/28 | (2006.01) |
| G06F 1/16 | (2006.01) |

(52) U.S. Cl.
CPC .............. *G06F 1/28* (2013.01); *G06F 1/1632* (2013.01); *G06F 1/263* (2013.01); *G06F 1/3206* (2013.01)

(58) Field of Classification Search
CPC .................................... G06F 1/32; G06F 1/26
See application file for complete search history.

(56) References Cited

U.S. PATENT DOCUMENTS

| 7,293,118 | B1 * | 11/2007 | Wright | G06F 13/4022 710/14 |
| 8,738,952 | B1 * | 5/2014 | Lachwani | G06F 1/3209 710/100 |
| 2005/0156038 | A1 * | 7/2005 | Wurzburg | G06F 1/266 235/435 |
| 2011/0113174 | A1 * | 5/2011 | Fang | G06F 13/4081 710/300 |
| 2012/0134087 | A1 * | 5/2012 | Peng | H05K 7/1492 361/679.02 |
| 2015/0171575 | A1 * | 6/2015 | Choi | H01R 24/62 439/607.01 |
| 2016/0043517 | A1 * | 2/2016 | Wu | H01R 9/0515 439/629 |
| 2016/0117274 | A1 * | 4/2016 | Waters | G06F 13/362 710/106 |

\* cited by examiner

*Primary Examiner* — Phil Nguyen
(74) *Attorney, Agent, or Firm* — Alpine Technology Law Group LLC

(57) ABSTRACT

In one example a power management module comprises logic, at least partially including hardware logic, to detect a disconnection on at least one signaling contact in a receptacle prior to a disconnection on the at least one power contact in the receptacle, wherein the receptacle is adapted to mate with a plug, the receptacle comprising a plurality of electrical contacts including at least one power contact to connect with a power pin on the plug and at least one signaling contact to connect with a signaling pin on the plug and in response to the disconnection on the signaling contact, to switch a processor to a low power state prior to a disconnect between the at least one power contact in the receptacle and the power pin on the plug. Other examples may be described.

22 Claims, 12 Drawing Sheets

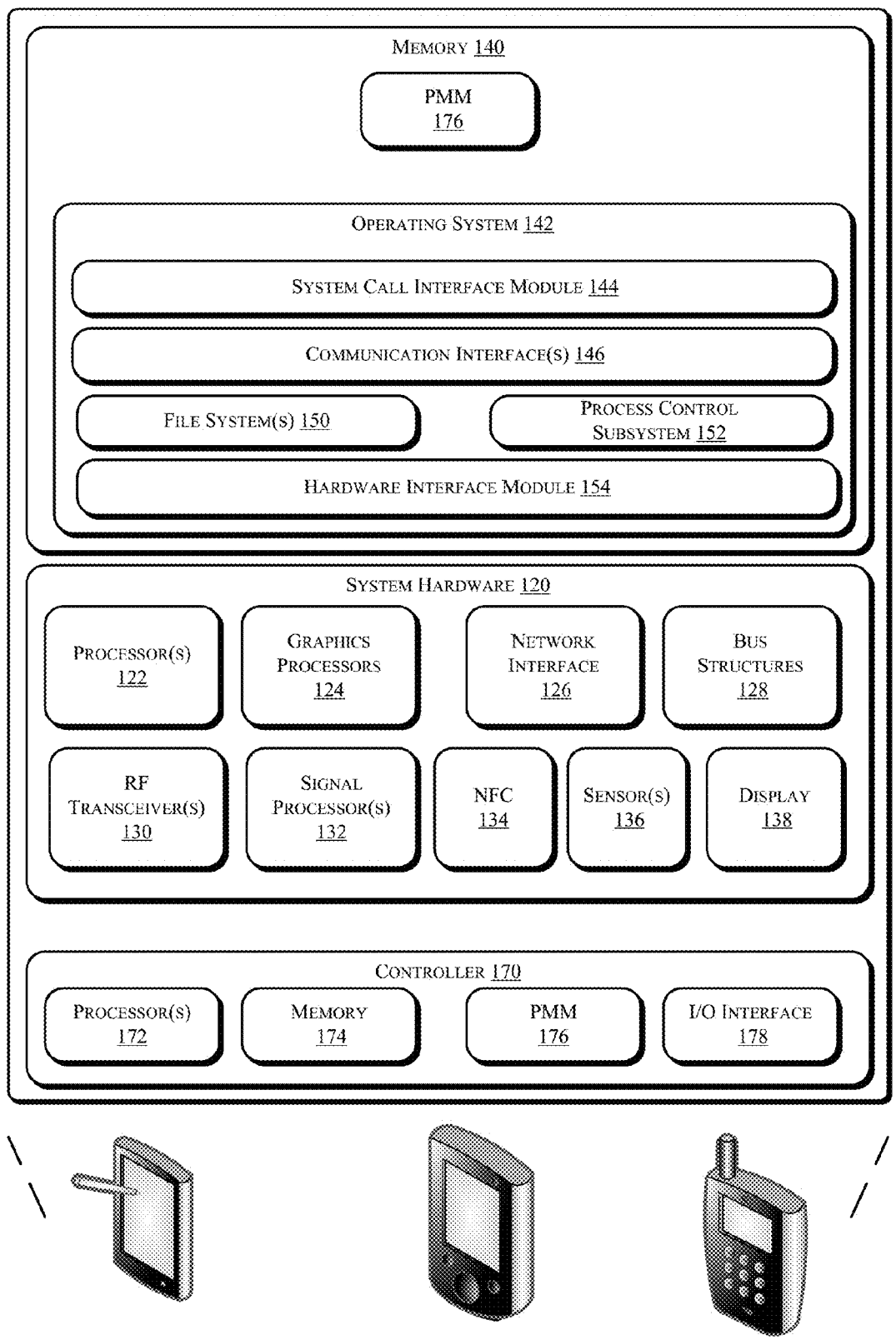
FIG. 1  Electronic Device 100

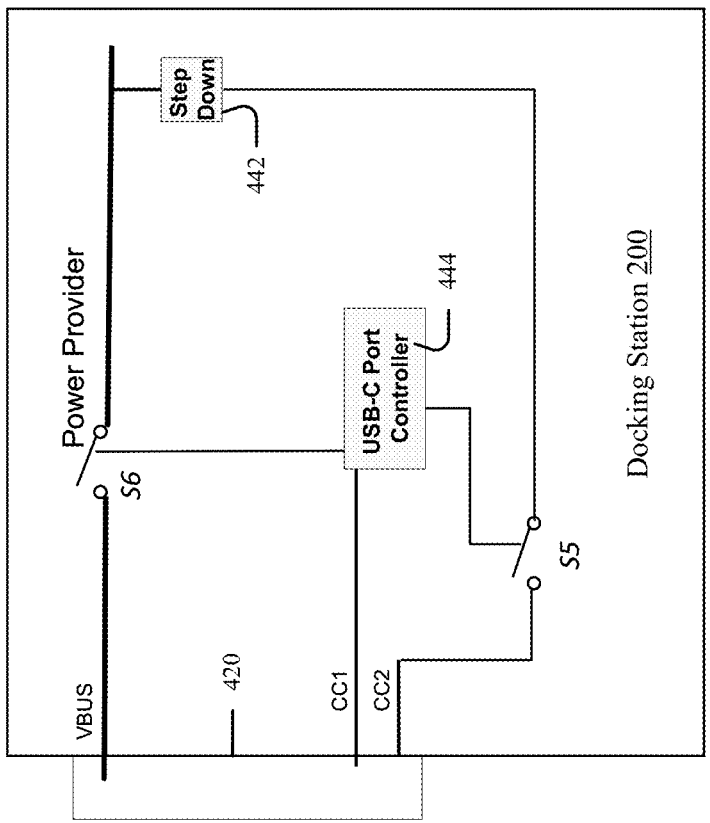
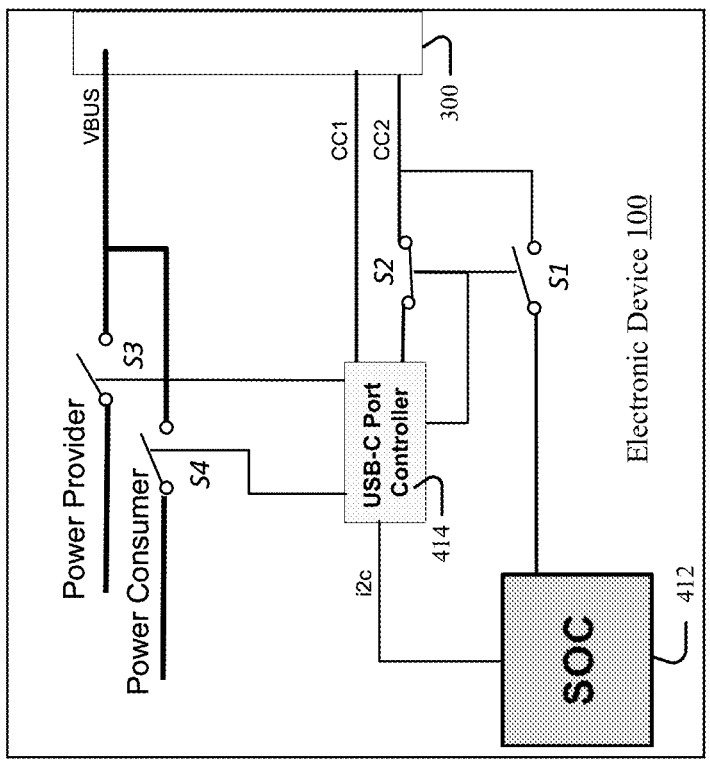
FIG. 4A

DETECTION OF UNDOCKING FOR ELECTRONIC DEVICES

RELATED APPLICATIONS

None.

BACKGROUND

The subject matter described herein relates generally to the field of electronic devices and more particularly to detection of undocking for electronic devices.

Performance aspects of dockable electronic devices, e.g., mobile phones, tablet computers, electronic readers and the like may be constrained by limitations of undocked capabilities (e.g., power delivery and thermal dissipation capability of the device). For example, an electronic device may have the capacity to burst to higher power (e.g., 9 watts) but no higher due to the power delivery limitations of the battery systems on the device. This is especially true for systems that utilize a single series battery configuration because the maximum power draw limited due to the lower voltage of having a single series cell.

Dockable electronic devices can utilize increased power delivery capacity and thermal dissipation capacity provided by a docking station. However, a sudden undocking event can cause a blue screen or shutdown the device since the system may be drawing more power than the battery can provide. Accordingly, techniques to detect an undocking event for electronic devices may find utility.

BRIEF DESCRIPTION OF THE DRAWINGS

The detailed description is described with reference to the accompanying figures.

FIGS. 1 and 2A-2B are schematic illustrations of electronic devices which may be adapted to implement detection of undocking in accordance with some examples.

FIGS. 4A-4C are schematic illustrations of a circuit arrangement which may be used with an electronic device adapted to implement detection of undocking in accordance with some examples.

DETAILED DESCRIPTION

Described herein are exemplary systems and methods to implement detection of undocking for electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide techniques to detect undocking of an electronic device from a docking station. To address this and other issues, the present disclosure describes techniques to detect an undocking of an electronic device from a remote device, e.g., a docking station. In some examples described herein an electronic device comprises a receptacle (e.g., a USB Type-C receptacle) adapted to mate with a plug (e.g., a USB Type-C plug). The receptacle comprises a plurality of electrical contacts including at least one power contact to connect with a power pin on the plug and at least one signaling contact to connect with a signaling pin on the plug. The electronic device further comprises a processor capable to operate in a first power consumption state when the plug is coupled to the receptacle such that the processor can draw electrical power from a remote device and in a second power state when the plug is uncoupled from the receptacle.

In the case of a USB Type-C connector the power pin(s) and the ground pin(s) on the receptacle are slightly longer (e.g., 0.5 mm) than the various signaling pins on the receptacle. Some techniques described herein utilize this difference in length by including a power management module comprising logic, at least partially including hardware logic, to detect a disconnection on the at least one signaling contact in the receptacle prior to a disconnection on the at least one power contact in the receptacle and in response to the disconnection on the signaling contact, to switch the processor to the second power state prior to a disconnect between the at least one power contact in the receptacle and the power pin on the plug. Additional structural and functional details will be described with reference to FIGS. 1A-10, below. While examples described herein are described with reference to a USB Type-C connector, one skilled in the art will recognize that the subject matter described herein is not limited to USB Type-C connectors and may be applied to other connectors.

Figure 2A:
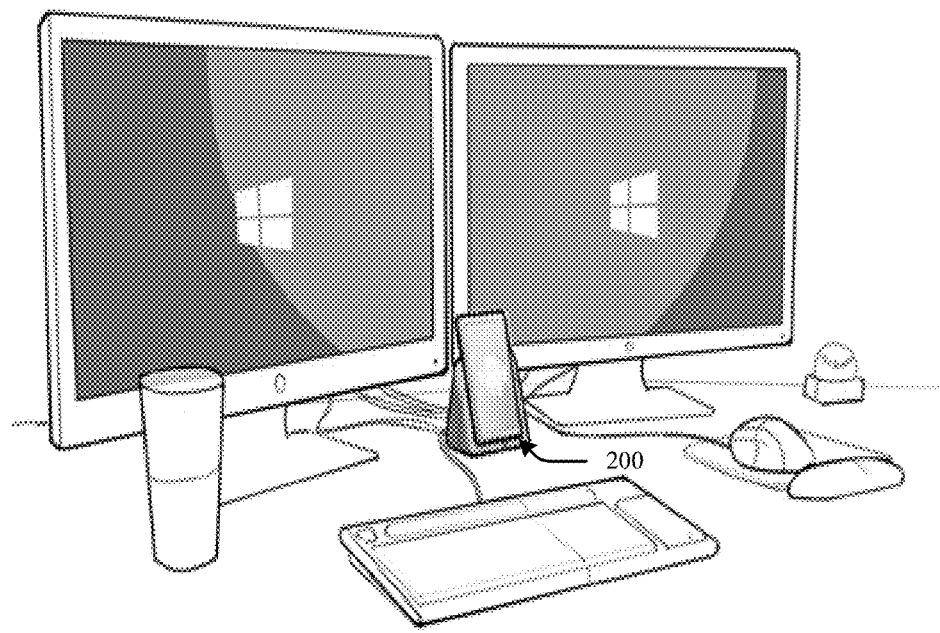
Figure 2B:
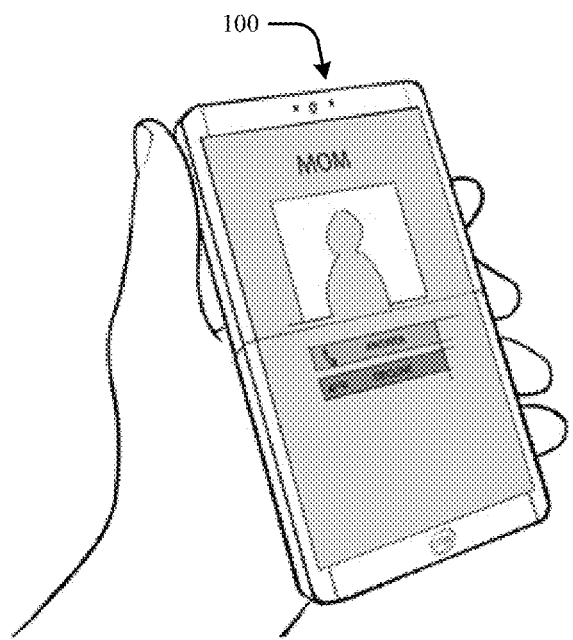

FIGS. 1 and 2A-2B are schematic illustrations of electronic devices which may be adapted to implement detection of undocking for in accordance with some examples. Referring first to FIG. 1, in various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more sensors 136 such as a thermal sensor, a coupling sensor, or the like. Electronic device 100 may further include one or more input/output interfaces such as, e.g., a keypad 136 and a display 138. In some examples electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may be logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms.

In the embodiment depicted in FIG. 1 the controller 170 comprises a processor 172, a memory module 174, a power management module (PMM) 176, and an I/O interface 178. In some examples the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples portions of the power management module 176 may reside in the memory 140 of electronic device 100 and may be executable on one or more of the processors 122.

In some examples the power management module 176 interacts with one or more other components of the electronic device 100 to detect docking and undocking events for the electronic device 100 and to manage power state of the electronic device in accordance with the docking status of the electronic device 100. For example, referring to FIG. 2A, the power management module 176 may establish a first power state for the electronic device 100 when the electronic device 100 is operating in an environment in which it is coupled to an external device such as a docking station 200 which provides access to additional power supplies and/or thermal dissipation systems. By contrast, referring to FIG. 2B, the power mode management module 176 may establish a second power state for the electronic device 100 when the electronic device 100 is operating independently.

Figure 3:
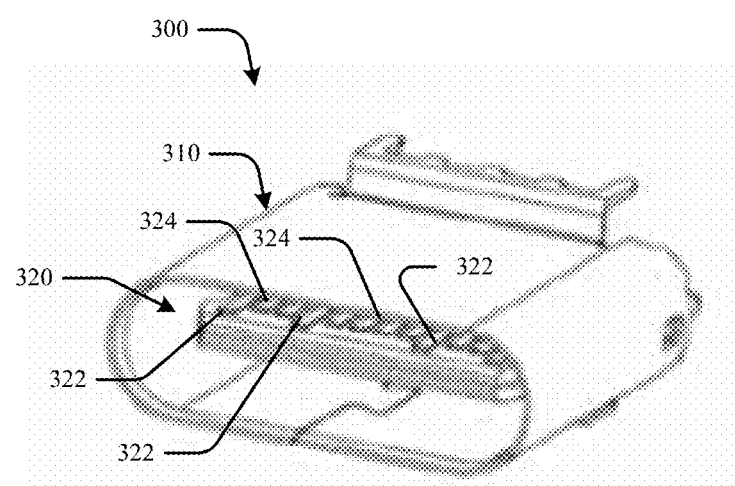
FIG. 3 is a perspective view of a USB Type-C receptacle in accordance with some examples.

As described above, in some examples the electronic device 100 may be coupled to a remote device such as a docking station 200 using a USB Type-C connector. FIG. 3 is a perspective view of a USB Type-C connector receptacle 300 in accordance with some examples. In the example depicted in FIG. 3 a USB Type-C receptacle 300 comprises a body 310 having an opening at a distal end to receive a plug (not shown). Receptacle 300 further comprises a plurality of electrical contacts indicated generally by reference numeral 320 including power and/or ground contacts 322 and signaling contacts 324. As described above, the power and/or ground contacts 322 are slightly longer (e.g., 0.5 mm) than the signaling pins 324.

Figure 4B:
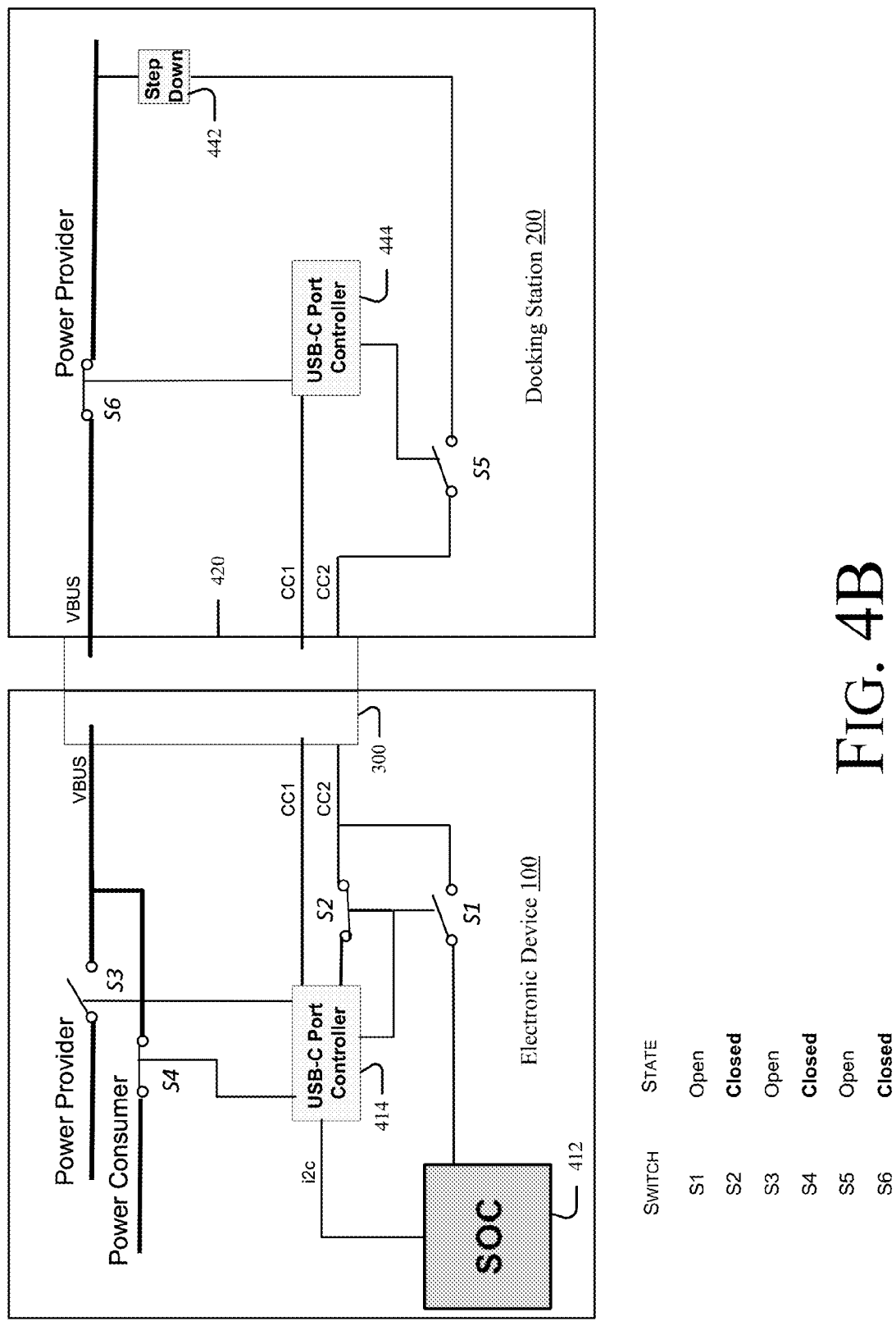
Figure 4C:
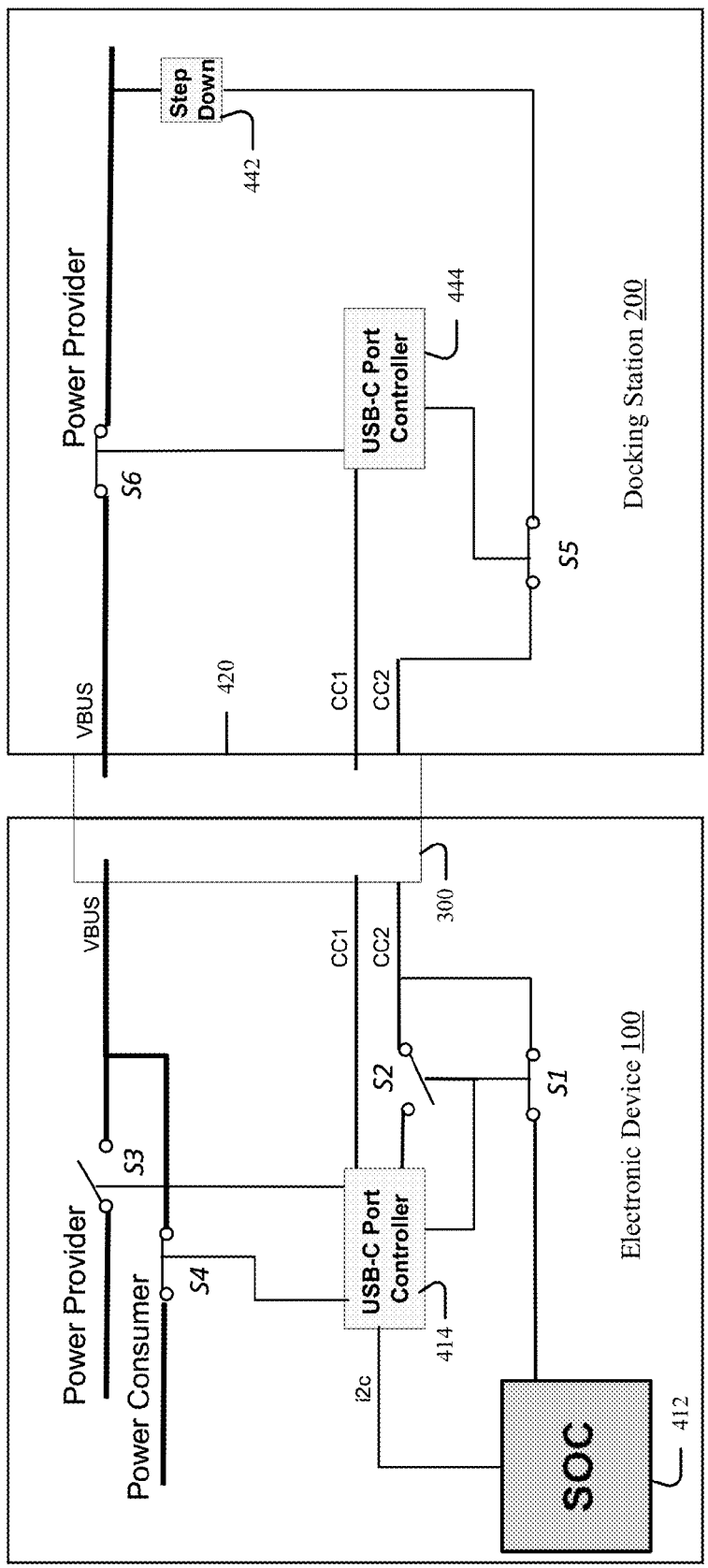

FIGS. 4A-4C are schematic illustrations of a circuit arrangement which may be used with an electronic device adapted to implement detection of undocking in accordance with some examples. Referring to FIGS. 4A-4C, in one example the electronic device 100 includes a processor 412, a USB-C port controller 414 coupled to a USB Type-C receptacle such as the receptacle 300 depicted in FIG. 3. Switch S1 selectively couples the processor 412 to signal line CC2. Switch S2 selectively couples CC2 to USB-C port controller 414. Switch S3 selectively couples power provider to Vbus, and switch S4 selectively couples a power consumer to Vbus. USB-C port controller 414 controls switches S1, S2, S3, and S4.

Similarly, docking station 200 includes a USB-C controller 444 coupled to a USB Type-C plug 420. Switch S5 selectively couples signal line CC2 to a power provider of the docking station via a step down regulator 412. Switch S6 selectively couples the Vbus to the power provider. USB-C port controller 444 controls switches S5 and S6.

FIG. 4A depicts the circuit arrangement when the electronic device 100 is disconnected from the docking station 200. In the disconnected state the default status for switches S1 is open and S2 is closed. Switches S4-S6 are all open. FIG. 4B depicts the circuit arrangement when the electronic device 100 is initially coupled to the docking station 200. In this state switches S4 and S6 are closed such that the power consumer on electronic device 100 is coupled to the power provider on the docking station 200 via Vbus.

When electronic device 100 is coupled to the docking station 200 the respective USB-C port controllers 414, 444 initiate a handshake procedure to negotiate power delivery and operating mode(s). When the handshake procedure is complete USB-C controller 414 closes switch S1 and opens switch S2 and USB-C port controller 444 closes switch S5 to connect Vbus from dock through step down regulator 442 to the processor 412 on the electronic device 100. In response, processor 412 may transition to a higher power operating state and may also signal other components of electronic device 100 to switch to a higher power operating state (FIG. 4C).

Having described various structures of a system to implement techniques to detect undocking for electronic devices, operating aspects of a system will be explained with reference to FIG. 5, which is a flowchart illustrating operations in a method to implement detection of undocking in electronic devices in accordance with some examples. In some examples the operations depicted in the flowchart of FIG. 5 may be implemented by the power management module 176, alone or in combination with other component of electronic device 100.

Figure 5:
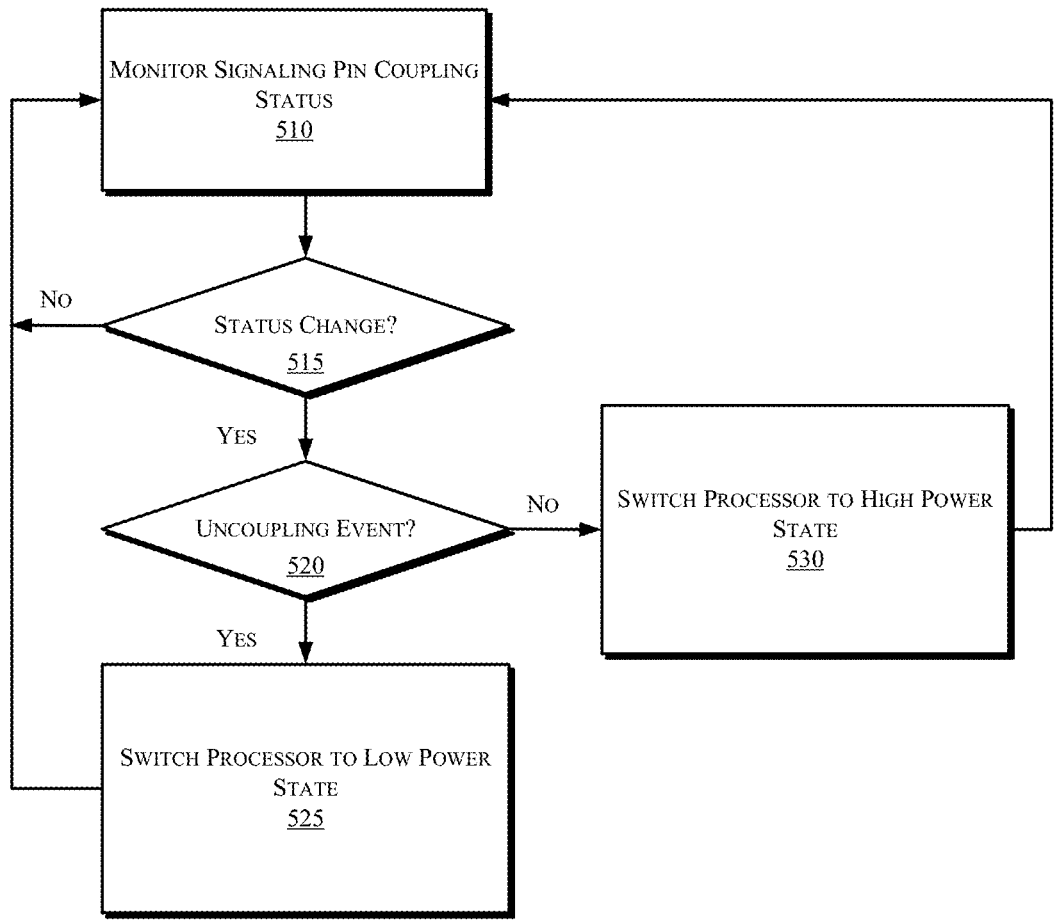
FIG. 5 is a flowchart illustrating operations in a method to implement detection of undocking in electronic devices in accordance with some examples.

Referring to FIG. 5, at operation 510 the power management module 176 monitors a signaling pin coupling status. In the example circuit arrangement depicted in FIGS. 4A-4C the power management module 176 may monitor the status of pin CC2.

At operation 515 it is determined whether there was a change in the coupling status of CC2, e.g., whether there was a coupling or uncoupling event. If there is no change in the coupling status of CC2 then control passes back to operation 510 and the power management module 176 continues to monitor. By contrast, if there was a status change then control passes to operation 520.

At operation 520 it is determined whether the status change was an uncoupling event. Because the signaling pins such as CC2 are slightly shorter (e.g., 0.5 mm) than the power pins such as Vbus the signaling pin(s) will disconnect before the power pins when the electronic device 100 is uncoupled from the docking station 200. When CC2 disconnects the input to the processor 412 from the step down regulator 442 is lost. The power management module 176 detects this loss and, in response, immediately transfers to a low-power state (operation 525).

In some examples the power management module 176 applies an indicator to the PROCHOT signal line of the processor 412. PROCHOT is an existing function of the processor 412 that warns the processor 412 that there is a thermal event that requires the processor to reduce power consumption. This thermal event could be that the processor power delivery subsystem is getting too hot, or that the surface/skin temperature of the system is getting too hot. In response to a PROCHOT indicator the processor 412 very quickly (e.g., between 100 microseconds and 1.0 milliseconds) transitions to a low frequency mode of operation (LFM). By moving to LFM, the power consumption of the processor drops dramatically.

By contrast, if at operation 520 the status change was not an uncoupling event, indicating that it was a coupling event, then control passes to operation 530. At operation 530 the operating mode management unit 176 modifies operating parameters for the electronic device 100 to accommodate the increased power delivery and/or heat dissipation capabilities provided by the docking station 200. By way of example, the power management module 176 may allow the operating frequency of one or more processors on the electronic device 100 to be increased. Alternatively, or in addition, the operating mode management unit may allow multiple displays to be powered by the electronic device 100 or to increase the brightness or resolution of displays powered by electronic device 100.

Once the operating parameters have been modified to compensate for the increase in the power delivery and/or thermal dissipation capabilities of docking station 200 control may pass back to operation 510 and the power management module 176 continues to monitor signaling pin coupling status.

Thus, the structure and operations described herein enable the power management module 176 to implement a dynamic operating parameter management algorithm for the electronic device 100 depending upon the power delivery and/or heat dissipation capabilities available electronic device 100. When the electronic device 100 is operating in a stand-alone environment it may operate according to a first power consumption state. However, when the electronic device is coupled to a docking station 200, then the device may be operating in accordance with a different power consumption state.

Figure 6:
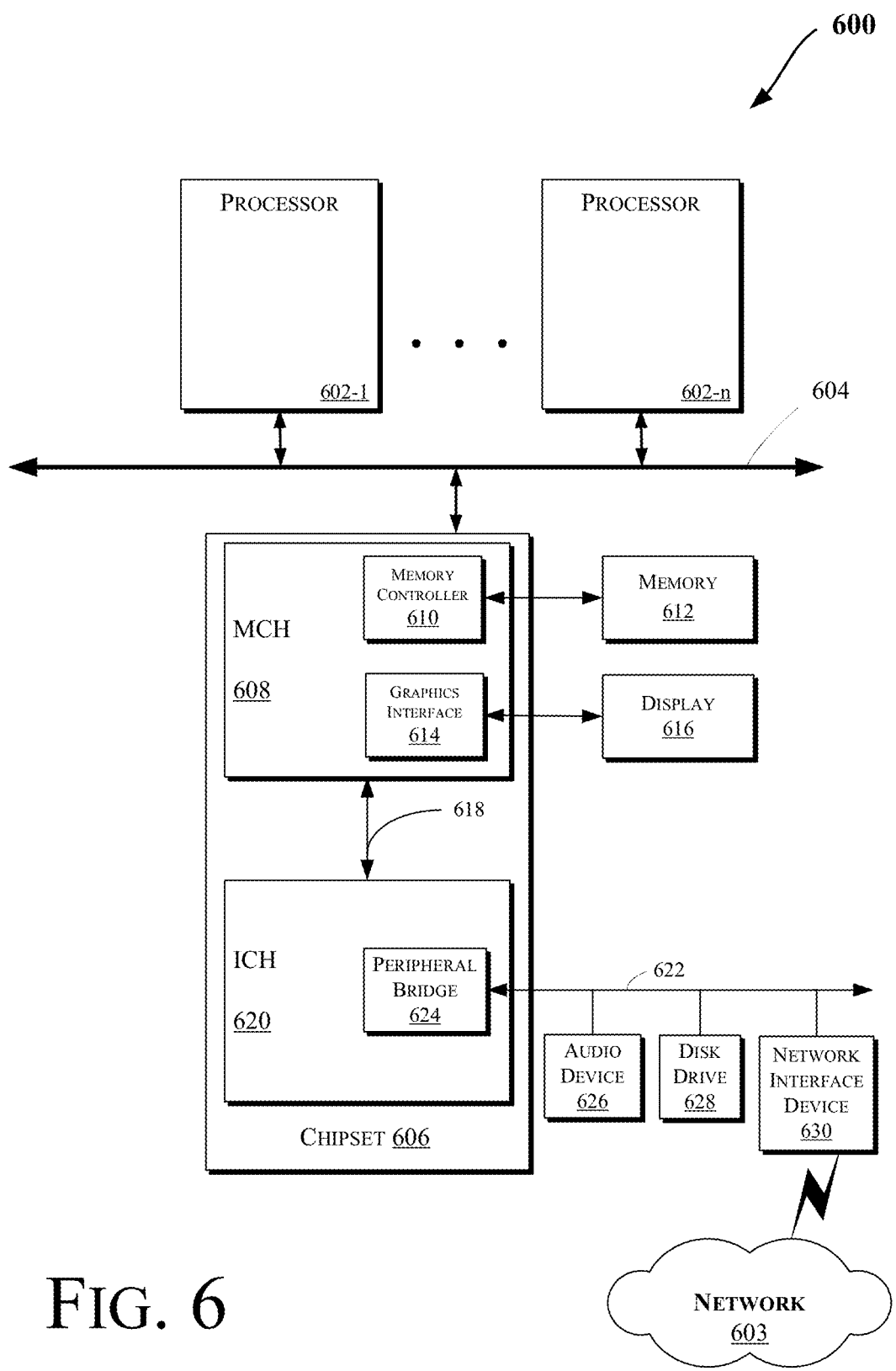
FIGS. 6-10 are schematic illustrations of electronic devices which may be adapted to implement detection of undocking in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

A chip set 606 may also communicate with the interconnection network 604. The chipset 606 may include a memory control hub (MCH) 608. The MCH 608 may include a memory controller 610 that communicates with a memory 612. The memory 612 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
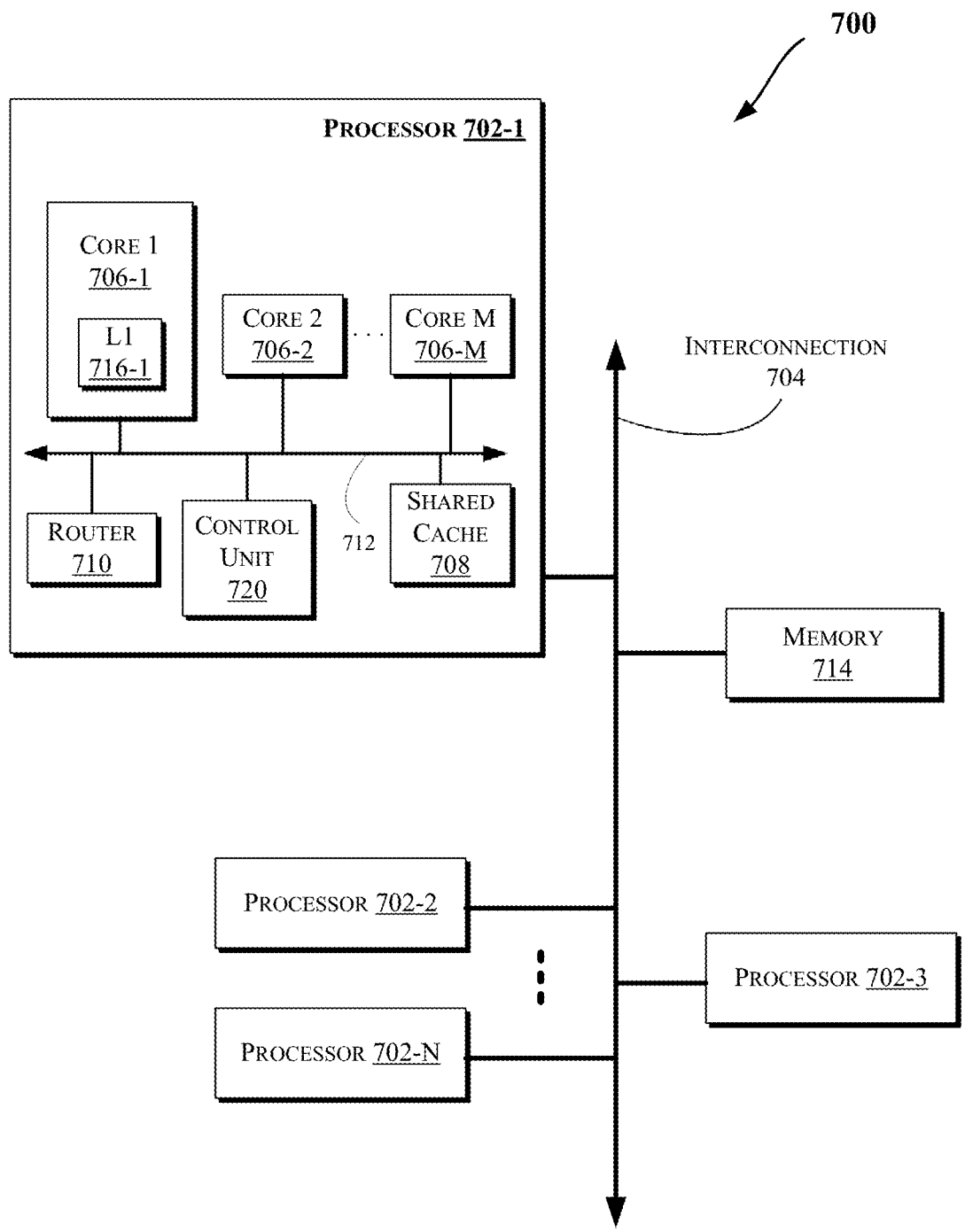

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
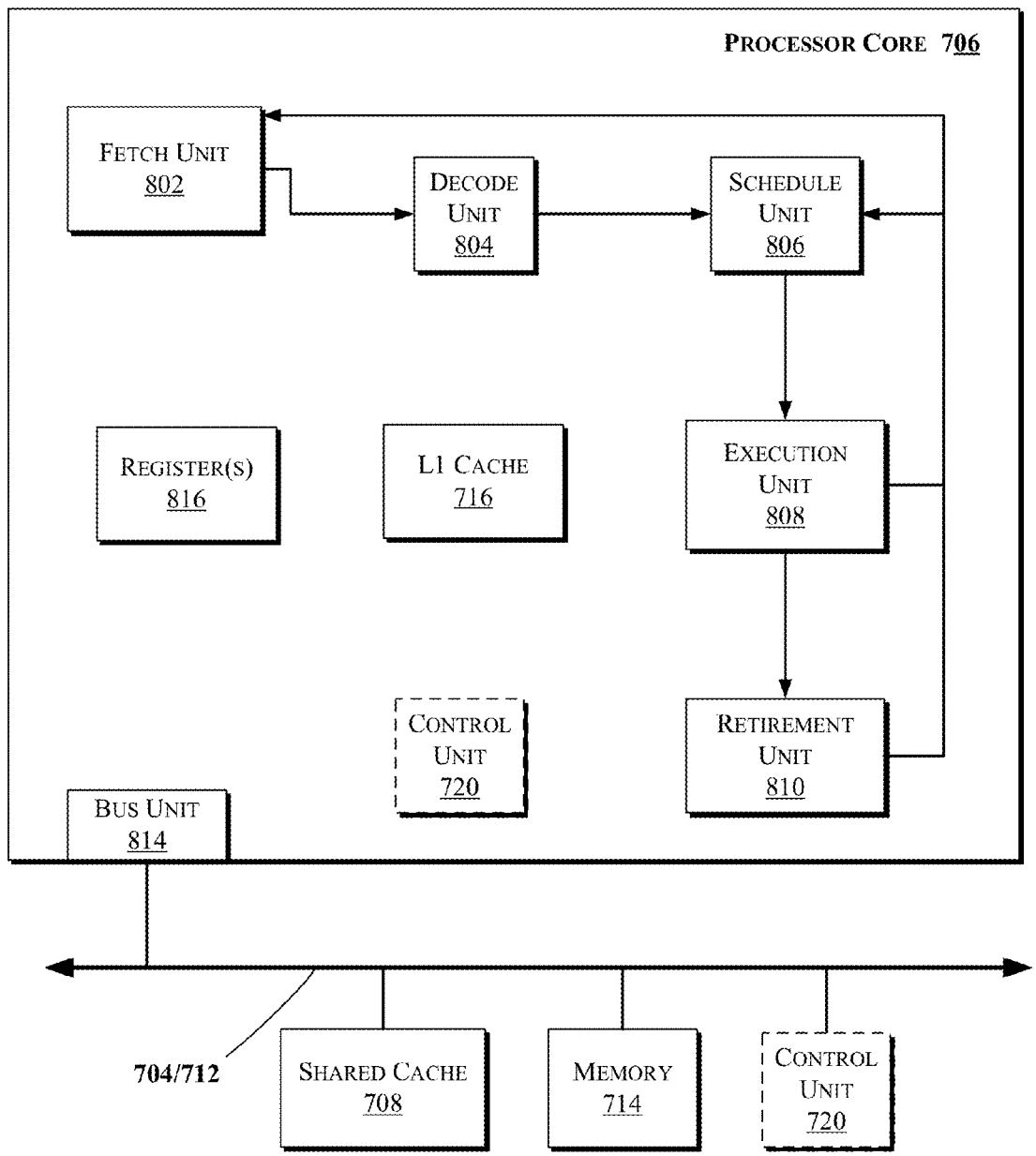

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 712 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
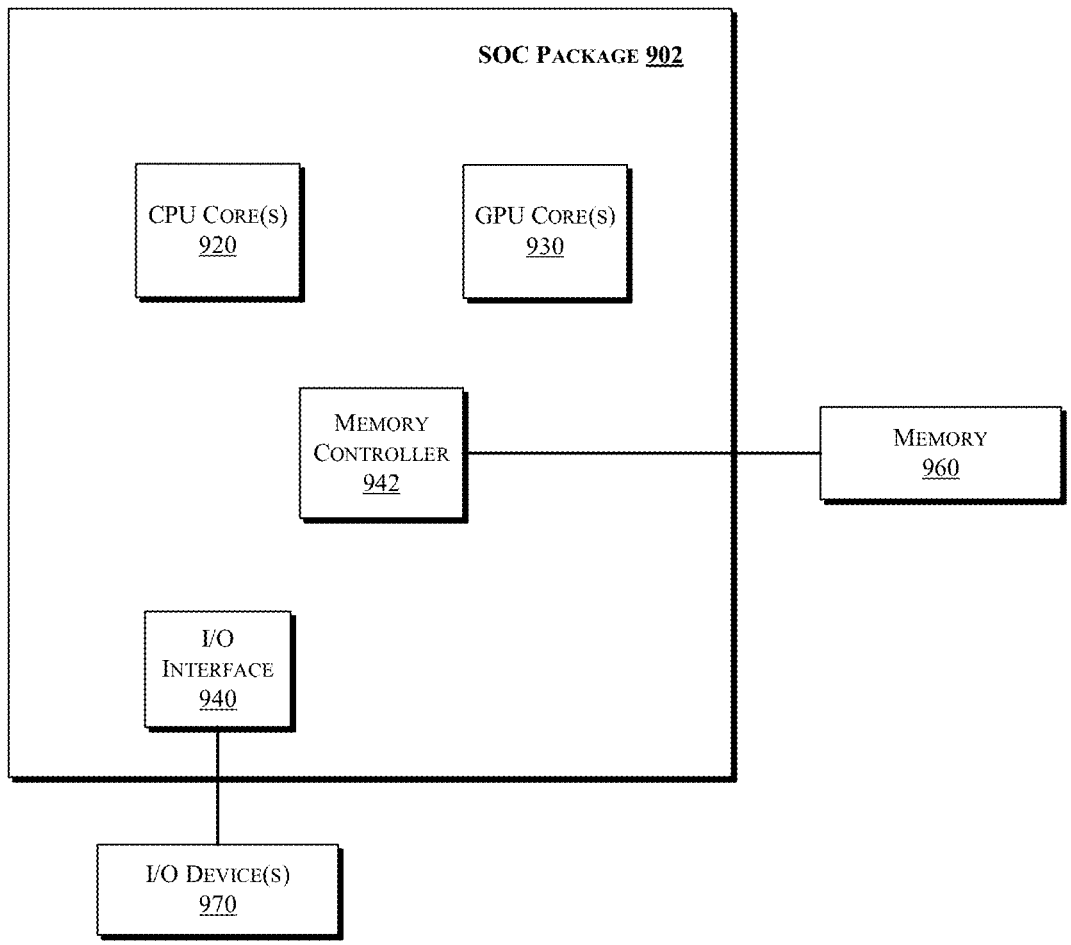

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
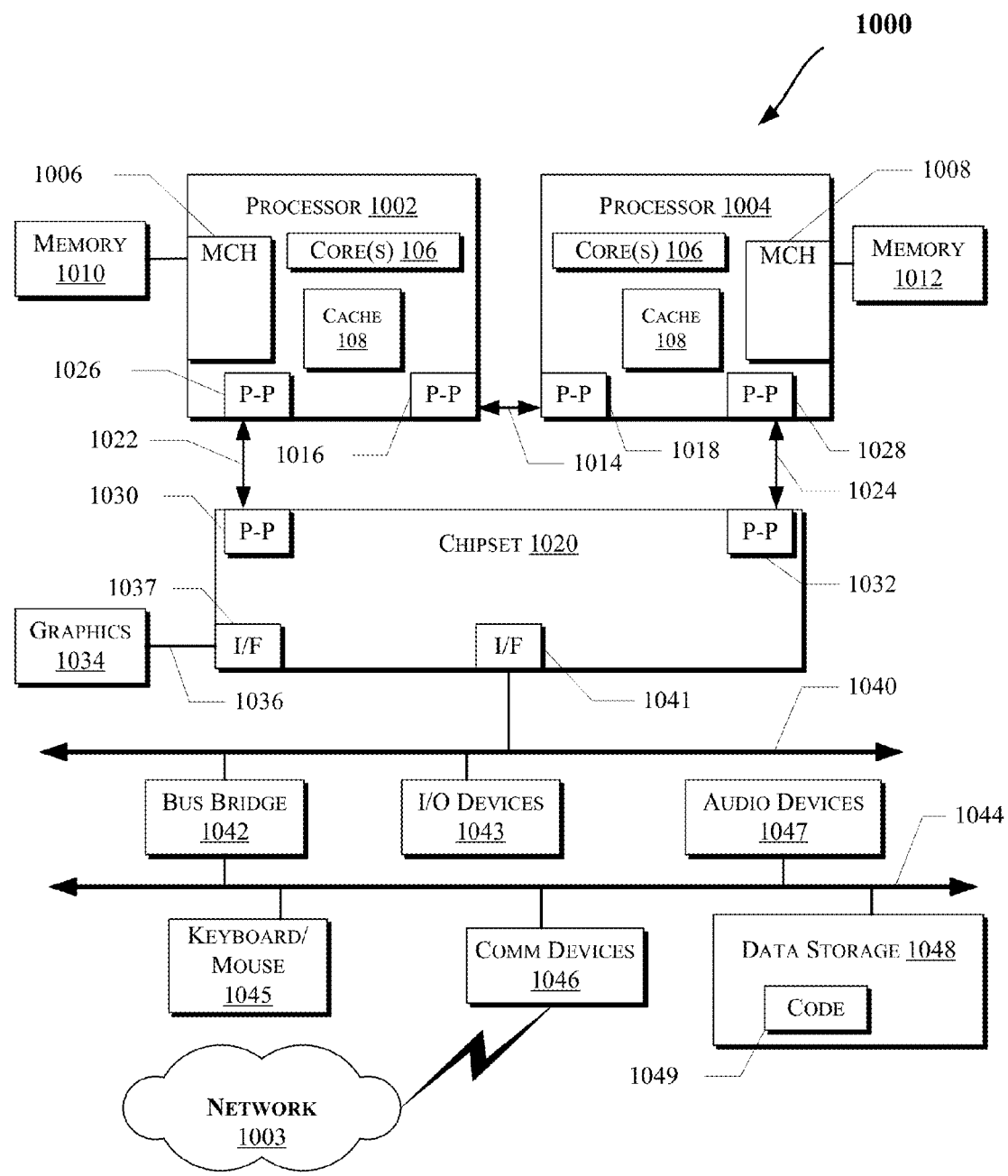

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following pertains to further examples.

Example 1 is an electronic device, comprising a receptacle adapted to mate with a plug, the receptacle comprising a plurality of electrical contacts including at least one power contact to connect with a power pin on the plug and at least one signaling contact to connect with a signaling pin on the plug, a processor capable to operate in a first power consumption state when the plug is coupled to the receptacle such that the processor can draw electrical power from a remote device and in a second power state when the plug is uncoupled from the receptacle, and a power management module comprising logic, at least partially including hardware logic, to detect a disconnection on the at least one signaling contact in the receptacle prior to a disconnection on the at least one power contact in the receptacle and in response to the disconnection on the signaling contact, to switch the processor to the second power state prior to a disconnect between the at least one power contact in the receptacle and the power pin on the plug.

In Example 2, the subject matter of Example 1 can optionally include logic, at least partly including hardware logic, to detect an open circuit on the at least one signaling contact.

In Example 3, the subject matter of any one of Examples 1-2 can optionally include logic, at least partly including hardware logic, to generate a PROCHOT signal and apply the PROCHOT signal to the processor.

In Example 4, the subject matter of any one of Examples 1-3 can optionally include logic, at least partially including hardware logic, configured to detect a connection on the at least one signaling contact in the receptacle, and in response to the connection, to couple the processor to a remote power source.

In Example 5, the subject matter of any one of Examples 1-4 can optionally include logic, at least partially including hardware logic, configured to detect a connection between a first port controller on the electronic device and a second port controller on a docking device, and in response to the connection, to couple the processor to a remote power source on the docking device.

In Example 6, the subject matter of any one of Examples 1-5 can optionally include logic, at least partially including hardware logic, configured to detect that the processor has been coupled to the remote power source and in response to detecting the connection, to switch the processor to the first power state.

In Example 7, the subject matter of any one of Examples 1-6 can optionally include an arrangement in which wherein the receptacle comprises a USB Type-C connector.

In Example 8 the subject matter of any one of Examples 1-7 can optionally include an arrangement in which the signaling contact has a first length and the power contact has a second length, and wherein the second length is longer than the first length.

In Example 9, the subject matter of any one of Examples 1-8 can optionally include an arrangement in which the second length is longer than the first length by approximately 0.5 millimeters (mm).

Example 10 is a power management module comprising logic, at least partly including hardware logic, to detect a disconnection on at least one signaling contact in a receptacle prior to a disconnection on the at least one power contact in the receptacle, wherein the receptacle is adapted to mate with a plug, the receptacle comprising a plurality of electrical contacts including at least one power contact to connect with a power pin on the plug and at least one signaling contact to connect with a signaling pin on the plug, and in response to the disconnection on the signaling contact, to switch a processor to a low power state prior to a disconnect between the at least one power contact in the receptacle and the power pin on the plug.

In Example 11 the subject matter of Example 10 can optionally include logic, at least partly including hardware logic, to detect an open circuit on the at least one signaling contact.

In Example 12, the subject matter of any one of Examples 10-11 can optionally include logic, at least partly including hardware logic, to generate a PROCHOT signal and apply the PROCHOT signal to the processor.

In Example 13, the subject matter of any one of Examples 10-12 can optionally include logic, at least partially including hardware logic, configured to detect a connection on the at least one signaling contact in the receptacle, and in response to the connection, to couple the processor to a remote power source.

In Example 14, the subject matter of any one of Examples 10-13 can optionally include logic, at least partially including hardware logic, configured to detect a connection between a first port controller on an electronic device and a second port controller on a docking device, and in response to the connection, to couple the processor to a remote power source on the docking device.

In Example 15, the subject matter of any one of Examples 10-14 can optionally include logic, at least partially including hardware logic, configured to detect that the processor has been coupled to the remote power source, and in response to detecting the connection, to switch the processor to the first power state.

In Example 16, the subject matter of any one of Examples 10-15 can optionally include a USB Type-C connector.

Example 17 is a method to manage a power state of a processor in an electronic device, comprising detecting a disconnection on at least one signaling contact in a receptacle prior to a disconnection on the at least one power contact in the receptacle, wherein the receptacle is adapted to mate with a plug, the receptacle comprising a plurality of electrical contacts including at least one power contact to connect with a power pin on the plug and at least one signaling contact to connect with a signaling pin on the plug, and in response to the disconnection on the signaling contact, switching the processor to a low power state prior to a disconnect between the at least one power contact in the receptacle and the power pin on the plug.

In Example 18, the subject matter of Example 18 can optionally include detecting an open circuit on the at least one signaling contact.

In Example 19, the subject matter of any one of Examples 18-19 can optionally include generating a PROCHOT signal and applying the PROCHOT signal to the processor.

In Example 20, the subject matter of any one of Examples 18-20 can optionally include detecting a connection on the at least one signaling contact in the receptacle, and in response to the connection, coupling the processor to a remote power source.

In Example 21, the subject matter of any one of Examples 18-20 can optionally include detecting a connection between a first port controller on an electronic device and a second port controller on a docking device, and in response to the connection, coupling the processor to a remote power source on the docking device.

In Example 22, the subject matter of any one of Examples 18-21 can optionally include detecting that the processor has been coupled to the remote power source, and in response to detecting the connection, switching the processor to the first power state.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An electronic device, comprising:
   a receptacle adapted to mate with a plug, the receptacle comprising a plurality of electrical contacts including at least one power contact to connect with a power pin on the plug, a step down power regulator, and at least one signaling contact to connect with a signaling pin on the plug via the step down power regulator;
   a processor capable to operate in a high frequency mode of operation when the plug is coupled to the receptacle such that the processor can draw electrical power from a remote device and in a low frequency mode of operation when the plug is uncoupled from the receptacle; and
   a power management module comprising logic, at least partially including hardware logic, to:
   detect a loss of an input from the step down power regulator caused by a disconnection on the at least one signaling contact in the receptacle prior to a disconnection on the at least one power contact in the receptacle; and
   in response to the loss of an input from the step down power regulator caused by the disconnection on the signaling contact, to switch the processor to the low frequency mode of operation prior to a disconnect between the at least one power contact in the receptacle and the power pin on the plug.

2. The electronic device of claim 1, wherein the power management module further comprises logic, at least partially including hardware logic, to:
   detect an open circuit on the at least one signaling contact.

3. The electronic device of claim 2, wherein the power management module further comprises logic, at least partially including hardware logic, to:
   generate a PROCHOT signal; and
   apply the PROCHOT signal to the processor.

4. The electronic device of claim 3, wherein the electronic device further comprises logic, at least partially including hardware logic, to:
   detect a connection on the at least one signaling contact in the receptacle, and
   in response to the connection, to couple the processor to a remote power source.

5. The electronic device of claim 4, wherein the electronic device further comprises logic, at least partially including hardware logic, to:
   detect a connection between a first port controller on the electronic device and a second port controller on a docking device, and
   in response to the connection, to couple the processor to a remote power source on the docking device.

6. The electronic device of claim 5, wherein the power management module further comprises logic, at least partially including hardware logic, to:
   detect that the processor has been coupled to the remote power source; and
   in response to detecting the connection, to switch the processor to the high frequency mode of operation.

7. The electronic device of claim 1, wherein the receptacle comprises a USB Type-C connector.

8. The electronic device of claim 1, wherein:
   the signaling contact has a first length and the power contact has a second length, and wherein the second length is longer than the first length.

9. The electronic device of claim 8, wherein the second length is longer than the first length by approximately 0.5 millimeters (mm).

10. A power management module comprising logic, at least partly including hardware logic, to:
    detect a loss of an input from a step down power regulator coupled to the power management module caused by a disconnection on at least one signaling contact in a receptacle prior to a disconnection on the at least one power contact in the receptacle, wherein the receptacle is adapted to mate with a plug, the receptacle comprising a plurality of electrical contacts including at least one power contact to connect with a power pin on the plug, a step down power regulator, and at least one signaling contact to connect with a signaling pin on the plug; and
    in response to the loss of an input from the step down power regulator caused by the disconnection on the signaling contact, to switch a processor to a low frequency mode of operation prior to a disconnect between the at least one power contact in the receptacle and the power pin on the plug.

11. The power management module of claim 10, further comprising logic, at least partially including hardware logic, to:
detect an open circuit on the at least one signaling contact.

12. The power management module of claim 11, further comprising logic, at least partially including hardware logic, to:
generate a PROCHOT signal; and
apply the PROCHOT signal to the processor.

13. The power management module of claim 12, further comprising logic, at least partially including hardware logic, to:
detect a connection on the at least one signaling contact in the receptacle; and
in response to the connection, to couple the processor to a remote power source.

14. The power management module of claim 13, further comprising logic, at least partially including hardware logic, to:
detect a connection between a first port controller on an electronic device and a second port controller on a docking device; and
in response to the connection, to couple the processor to a remote power source on the docking device.

15. The power management module of claim 14, further comprising logic, at least partially including hardware logic, to:
detect that the processor has been coupled to the remote power source; and
in response to detecting the connection, to switch the processor to the high frequency mode of operation.

16. The power management module of claim 9, wherein the receptacle comprises a USB Type-C connector.

17. A method to manage a power state of a processor in an electronic device, comprising:
detecting a loss of an input from a step down power regulator coupled to the power management module caused by a disconnection on at least one signaling contact in a receptacle prior to a disconnection on the at least one power contact in the receptacle, wherein the receptacle is adapted to mate with a plug, the receptacle comprising a plurality of electrical contacts including at least one power contact to connect with a power pin on the plug, a step down power regulator, and at least one signaling contact to connect with a signaling pin on the plug; and
in response to the loss of an input from the step down power regulator coupled to the power management module caused by the disconnection on the signaling contact, switching the processor to a low frequency mode of operation prior to a disconnect between the at least one power contact in the receptacle and the power pin on the plug.

18. The method of claim 17, further comprising:
detecting an open circuit on the at least one signaling contact.

19. The method of claim 18, further comprising:
generating a PROCHOT signal; and
applying the PROCHOT signal to the processor.

20. The method of claim 19, further comprising:
detecting a connection on the at least one signaling contact in the receptacle; and
in response to the connection, coupling the processor to a remote power source.

21. The method of claim 20, further comprising:
detecting a connection between a first port controller on an electronic device and a second port controller on a docking device; and
in response to the connection, coupling the processor to a remote power source on the docking device.

22. The method of claim 14, further comprising:
detecting that the processor has been coupled to the remote power source; and
in response to detecting the connection, switching the processor to the high frequency mode of operation.

* * * * *